(12) United States Patent
Choi et al.

(10) Patent No.: US 9,183,748 B2
(45) Date of Patent: Nov. 10, 2015

(54) APPARATUS FOR DETERMINING AVAILABLE PARKING SPACE AND METHOD THEREOF

(71) Applicant: Hyundai Motor Company, Seoul (KR)

(72) Inventors: Jae Seob Choi, Hwaseong-si (KR); Dae Joong Yoon, Hwaseong-si (KR); Eu Gene Chang, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 314 days.

(21) Appl. No.: 13/954,596

(22) Filed: Jul. 30, 2013

(65) Prior Publication Data

US 2014/0285362 A1 Sep. 25, 2014

(30) Foreign Application Priority Data

Mar. 19, 2013 (KR) .................. 10-2013-0029182

(51) Int. Cl.
| | |
|---|---|
| *G08G 1/14* | (2006.01) |
| *G08G 1/04* | (2006.01) |
| *G08G 1/16* | (2006.01) |
| *B62D 15/02* | (2006.01) |
| *G01S 13/93* | (2006.01) |
| *G01S 15/93* | (2006.01) |

(52) U.S. Cl.
CPC .. *G08G 1/14* (2013.01); *G08G 1/04* (2013.01); *G08G 1/168* (2013.01); *B60R 2300/806* (2013.01); *B62D 15/027* (2013.01); *B62D 15/028* (2013.01); *G01S 2013/9314* (2013.01); *G01S 2015/936* (2013.01)

(58) Field of Classification Search
CPC ........... G08G 1/04; G08G 1/14; G08G 1/168; B62D 15/027; B62D 15/028; B60R 2300/806; G01S 2013/9314; G01S 2015/936
See application file for complete search history.

(56) References Cited

U.S. PATENT DOCUMENTS

| | | | |
|---|---|---|---|
| 2009/0095084 A1* | 4/2009 | Barth et al. | ...................... 73/597 |
| 2010/0118140 A1* | 5/2010 | Iwakiri et al. | .................. 348/135 |
| 2010/0283632 A1* | 11/2010 | Kawabata et al. | .......... 340/932.2 |

FOREIGN PATENT DOCUMENTS

| | | |
|---|---|---|
| JP | 2011-168258 A | 9/2011 |
| KR | 10-2008-0024776 A | 3/2008 |
| KR | 10-2009-0041087 A | 4/2009 |
| KR | 10-2010-0024022 A | 3/2010 |
| KR | 10-1101372 B1 | 1/2012 |
| KR | 10-2012-0045960 A | 5/2012 |

\* cited by examiner

*Primary Examiner* — Andrew Bee
(74) *Attorney, Agent, or Firm* — McDermott Will & Emery LLP

(57) ABSTRACT

Provided is an apparatus for determining an available parking space. The apparatus includes: an ROI setter setting an ROI for a parking space based on an entrance region of a searched parking space when searching for the corresponding parking space for parking a vehicle; a sensed value processor extracting sensed values measured in the set ROI from sensed values measured by an ultrasonic wave sensor and projecting the extracted sensed values upon an end of the corresponding parking space; a weight applier identifying a shape of the parking space and an output direction of the ultrasonic wave sensor and applying a weight to the projected sensed values according to the shape of the parking space and the output direction of the ultrasonic wave sensor; and a space occupancy determiner determining whether the corresponding parking space is occupied based on the applied weight to the projected sensed values.

13 Claims, 8 Drawing Sheets

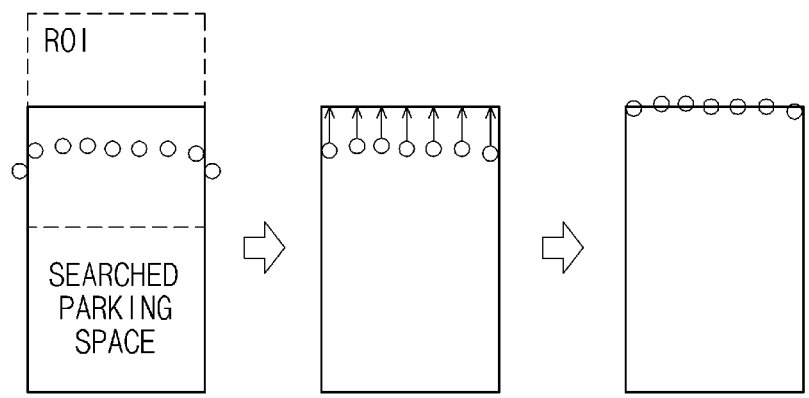

APPARATUS FOR DETERMINING AVAILABLE PARKING SPACE AND METHOD THEREOF

CROSS-REFERENCE TO RELATED APPLICATION

This application claims benefit of priority to Korean Patent Application No. 10-2013-0029182, filed on Mar. 19, 2013 in the Korean Intellectual Property Office, the disclosure of which is incorporated herein in its entirety by reference.

BACKGROUND

1. Technical Field

The present disclosure relates to an apparatus for determining an available parking space and a method thereof, and more particularly, to a technique for more accurately determining an available parking space by using an ultrasonic wave sensed value.

2. Background

Generally, a parking space is recognized by using an Around View Monitoring (AVM) image and an ultrasonic wave sensed value obtained in a parking mode.

In a case of recognizing a parking space based on the AVM image, various types of parking spaces may be simultaneously recognized. Meanwhile, since it is impossible to recognize a parking space according to a type thereof in a case of recognizing a parking space based on an ultrasonic wave sensed value, the accuracy of parking space recognition based on the AVM image is higher than that based on the ultrasonic wave sensed value.

However, when determining an occupation of parking space, since the parking space recognition based on the AVM image is performed by using a synthesized image of all around top views, an image distortion is generated so that an error may occur in determining whether a corresponding parking space is occupied.

SUMMARY OF THE DISCLOSURE

In view of the above-mentioned problems, the present disclosure provides an apparatus for determining an available parking space which can more exactly determine whether a parking space is available by using an ultrasonic wave sensed value and a method thereof.

The present disclosure further provides an apparatus for determining an available parking space which can more exactly determine whether a parking space is available by applying a weight to an ultrasonic wave sensed value considering a shape of a parking space and an output direction of an ultrasonic wave sensor, and a method thereof.

In accordance with an aspect of the present disclosure, an apparatus for determining an available parking space includes: an ROI setter configured to set an ROI for a parking space based on an entrance region of a searched parking space when searching for the corresponding parking space for parking a vehicle; a sensed value processor configured to extract sensed values measured in the set ROI from sensed values measured by an ultrasonic wave sensor and project the extracted sensed values upon an end of the corresponding parking space; a weight applier configured to identify a shape of the parking space and an output direction of the ultrasonic wave sensor and apply a weight to the projected sensed values according to the shape of the parking space and the output direction of the ultrasonic wave sensor; and a space occupancy determiner configured to determine whether the corresponding parking space is occupied based on the applied weight to the projected sensed values. The ROI setter is further configured to set the ROI into the shape of the searched parking space. The sensed value processor is configured to project the sensed values measured in the ROI in the entrance direction of the parking space. The sensed value processor is configured to generate a rectangular region in which it is expected that another vehicle exists and project the sensed valued measured in the ROI upon an end of the rectangular region. The weight applier is configured to model a relation between the shape of the parking space and the output direction of the ultrasonic wave sensor and apply the weight to the projected sensed values. The weight applier is further configured to model the relation between the shape of the parking space and the output direction of the ultrasonic wave sensor by using one of a uniform function, a Gaussian function and a Rayleigh function. The space occupancy determiner is further configured to determine that the corresponding parking space is occupied when a sum of weights applied to the projected sensed values is greater than a predetermined reference value.

In accordance with an aspect of the present disclosure, a method of determining an available parking space includes: setting a Region of Interest (ROI) for a parking space based on an entrance region of a searched parking space when searching for the corresponding parking space for parking a vehicle; extracting sensed values measured in the set ROI from sensed values measured by an ultrasonic wave sensor and projecting the extracted sensed values upon an end of the corresponding parking space; identifying a shape of the parking space and an output direction of the ultrasonic wave sensor and applying a weight to the projected sensed values according to the shape of the parking space and the output direction of the ultrasonic wave sensor; and determining whether the corresponding parking space is occupied based on the applied weight to the projected sensed values. The projecting of the extracted sensed values projects the sensed values measured in the ROI in the entrance direction of the parking space. The projecting of the extracted sensed values generates a rectangular region in which it is expected that another vehicle exists and projects the sensed valued measured in the ROI upon an end of the rectangular region. The projecting of the extracted sensed values includes modeling a relation between the shape of the parking space and the output direction of the ultrasonic wave sensor. The modeling models the relation between the shape of the parking space and the output direction of the ultrasonic wave sensor by using one of a uniform function, a Gaussian function and a Rayleigh function. The determining of the space occupancy includes comparing a sum of weights applied to the projected sensed values with a predetermined reference value, and determining that the corresponding parking space is occupied when the sum of weights is greater than the predetermined reference value as a comparison result.

BRIEF DESCRIPTION OF THE DRAWINGS

The objects, features and advantages of the present disclosure will be more apparent from the following detailed description in conjunction with the accompanying drawings, in which:

FIGS. 2A-C and 3A-C are exemplary diagrams which are referred to illustrate an ROI setting operation of an apparatus for determining an available parking space according to an exemplary embodiment of the present disclosure;

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
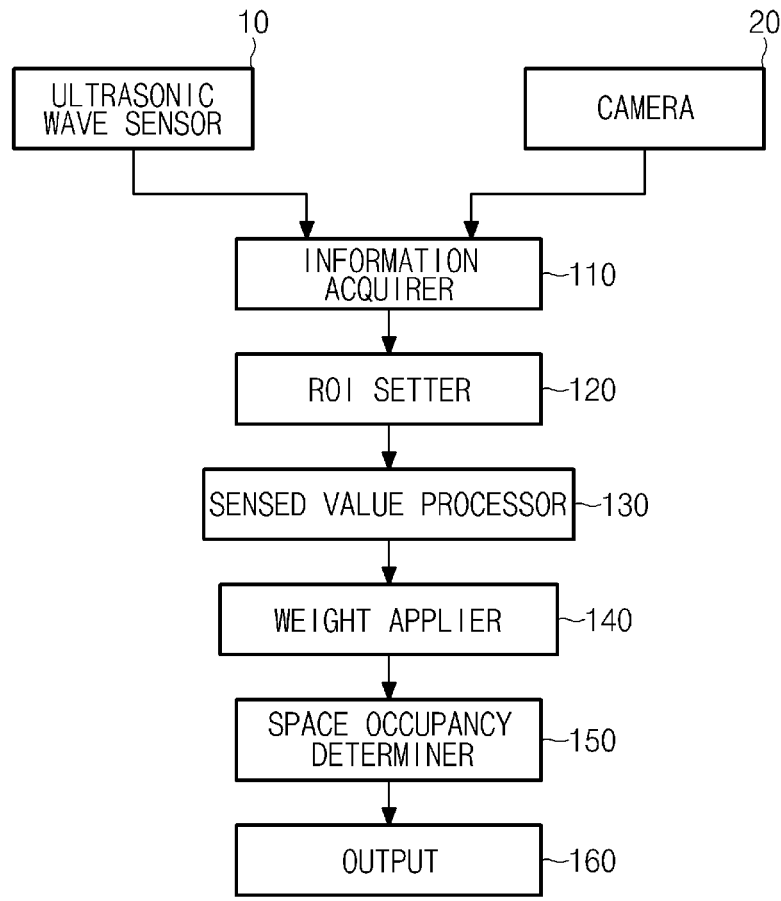
FIG. 1 is a block diagram showing an apparatus for determining an available parking space according to an exemplary embodiment of the present disclosure.

FIG. 1 is a block diagram showing an apparatus for determining an available parking space according to the present disclosure. Referring to FIG. 1, the apparatus for determining an available parking space, hereinafter, referred to as a 'determination apparatus', includes an ultrasonic wave sensor 10, a camera 20, an information acquirer 110, an ROI setter 120, a sensed value processor 130, a weight applier 140, a space occupancy determiner 150 and an output 160.

The ultrasonic wave sensor 10 is disposed at an outside of a vehicle such that a signal is generated near the vehicle and receives a reflective signal from an outside. It is sensed whether any vehicles or obstacles exist near the vehicle and a distance is sensed, based on the signal received at the ultrasonic wave sensor 10.

The camera 20 photographs images near the vehicle and view-converts the photographed image to obtain an AVM image.

When the ultrasonic wave sensor 10 and the camera 20 are disposed in a previous vehicle, the determination apparatus may not include the ultrasonic wave sensor 10 and the camera 20 and may receive acquired data from the ultrasonic wave sensor 10 and the camera 20 disposed in the vehicle.

The information acquirer 110 obtains the ultrasonic wave sensed value and the AVM image acquired through the ultrasonic wave sensor 10 and the camera 20. As the obtained information includes information about a current location of the vehicle, the information acquirer 110 obtains in real time the ultrasonic wave sensed value and the AVM image based on the current location varied when the location of the vehicle is varied.

The ROI setter 120 sets an Region of Interest (ROI) about the parking space searched when searching for a space for parking the vehicle. The ROI setter 120 sets the ROI based on an entrance region of the searched parking space. The ROI is set in a shape of the searched parking space.

The sensed value processor 130 extracts sensed values measured in the set ROI which is set by the ROI setter 120 from sensed values measured by the ultrasonic wave sensor 10. The sensed value processor 130 projects the sensed values extracted in the ROI upon a specific location.

As one example, the sensed value processor 130 may generate a rectangular region in which it is expected that another vehicle exists in the parking space and may project the sensed valued measured in the ROI upon an end of the rectangular region. The sensed value processor 130 projects the sensed values measured in the ROI in the entrance direction of the parking space.

Meanwhile, the weight applier 140 may first identify a shape of the searched parking space and a signal output direction of the ultrasonic wave sensor 10. The weight applier 140 may model a relation between the identified shape of the parking space and the output direction of the ultrasonic wave sensor 10. The weight applier 140 models the relation between the shape of the parking space and the output direction of the ultrasonic wave sensor 10 by using one of a uniform function, a Gaussian function and a Rayleigh function. In one embodiment of the present disclosure, the relation between the shape of the parking space and the output direction of the ultrasonic wave sensor 10 may be modeled by using the Rayleigh function. However, other suitable types of functions may be applied to the modeling of the relation between the shape of the parking space and the output direction of the ultrasonic wave sensor 10 as well.

The weight applier 140 may apply weights to the sensed values from the ultrasonic wave sensor 10 by using the relation model of the shape of the parking space and the output direction of the ultrasonic wave sensor 10. The more perpendicular the output direction of the ultrasonic wave sensor 10 is to a width direction of the parked vehicle, the more the weight applier 140 applies similar weights to the sensed values in the entire projection range. Further, the less perpendicular the output direction of the ultrasonic wave sensor 10 is to width direction of the parked vehicle, the more the weight applier 140 applies weights to the sensed values in a narrower projection range. In this case, the weight applier 140 applies a greater weight to the sensed values corresponding to the positions closer to the vehicle and applies a lower weight to the sensed values corresponding to the positions more far away from the vehicle. The configuration of applying the weights to the sensed values from the ultrasonic wave sensor 10 will be described in more detail with reference to FIGS. 4A to 7.

The space occupancy determiner 150 may calculate the sum of the weights of the sensed values set by the weight setter 120 and compare the calculated sum of weights with a predetermined reference value. When the calculated sum of weights is greater than the predetermined reference value, the space occupancy determiner 150 may determine that the corresponding parking space is occupied.

Conversely, when the calculated sum of weights is equal to or less than the predetermined reference value, the space occupancy determiner 150 determines that the corresponding parking space is available.

Thus, the output 160 may output the determination result of the space occupancy determiner 150 through a monitor. In this case, a user may easily recognize the available parking space from the information output through the monitor.

FIGS. 2A-C and 3A-C are exemplary diagrams which are referred to illustrate an ROI setting operation of the apparatus for determining an available parking space according to the embodiment.

First, FIGS. 2A-C show a searched parking space having a rectangular shape. The determination apparatus sets the ROI based on the entrance region of the searched parking space from the sensed values of the ultrasonic wave sensor as shown in FIG. 2A. In this time, the determination apparatus may identify the shape of the searched parking space. As the shape of the searched parking space is rectangular, the determination apparatus sets the ROI for a rectangular shape.

The determination apparatus may extract the sensed values in the set ROI and project them in the entrance direction of the parking space, as shown in FIGS. 2B and 2C.

Figures 3A, 3B, 3C:
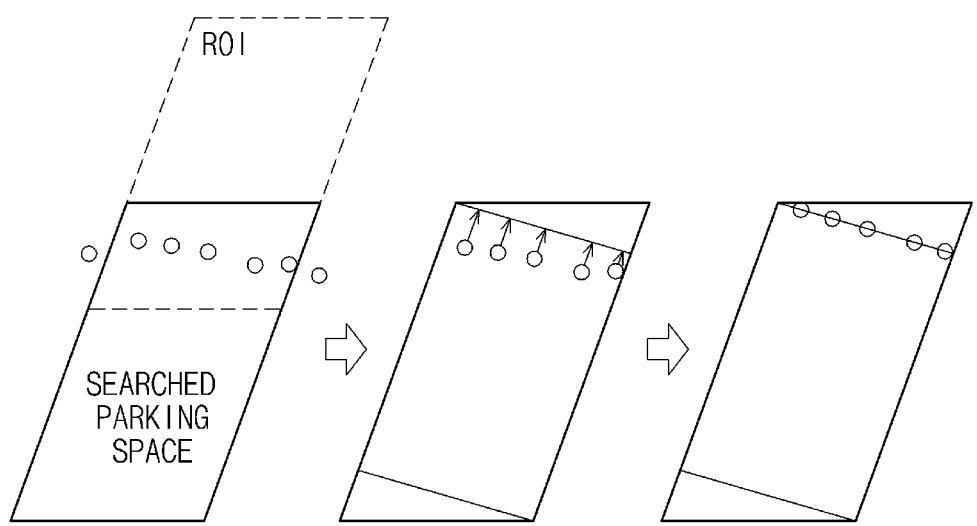

Meanwhile, FIGS. 3A-C shows a searched parking space having a parallelogram shape. The determination apparatus may set the ROI based on the entrance region of the searched parking space from the sensed values of the ultrasonic wave sensor as shown in FIG. 3A. In this case, the determination apparatus may identify the shape of the searched parking space. As the searched parking space has the parallelogram shape, the determination apparatus also sets the ROI for a parallelogram shape.

In contrast to the rectangular shaped space in FIGS. 2A-C, since the searched parking space in the embodiment of FIGS. 3A-C has the parallelogram shape, the determination apparatus may generate a rectangular region in which it is expected that another vehicle exists in the corresponding parking space as shown in FIG. 3B, extract the sensed values in the set ROI as shown in FIG. 3C, and project them upon the end of rectangular region. In this embodiment, the determination apparatus projects the sensed values in the entrance direction of the parking space.

FIGS. 4A to 7 are exemplary diagrams which are referred to illustrate a weight applying operation of an apparatus for determining an available parking space according to an exemplary embodiment of the present disclosure. FIGS. 4A to 7 show sensor output types according to locations of a vehicle parked in a parking space and a moving direction of the user vehicle.

Figure 4A:
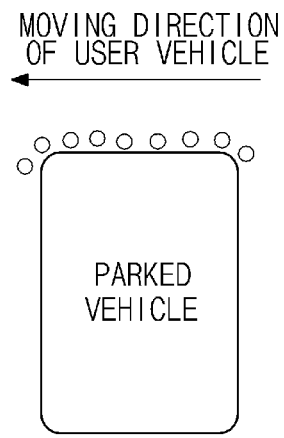
FIGS. 4A-B, 5A-B, 6A-B and 7 are exemplary diagrams which are referred to illustrate a weight applying operation of an apparatus for determining an available parking space according to an exemplary embodiment of the present disclosure.
Figure 4B:
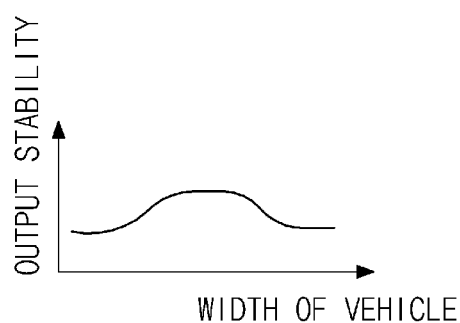

First, FIG. 4A shows a moving direction of the user vehicle and a width direction of a vehicle parked in a parking space, which are parallel with each other. In this example, since the output direction of the ultrasonic wave sensor of the user vehicle is perpendicular to the width direction of the parked vehicle, the sensor values are uniformly output on the surface of facing the side surface of the user vehicle, as shown in FIG. 4B. Thus, it is known that the output stability of the ultrasonic sensor is similarly distributed in the width direction of the vehicle.

Figure 5A:
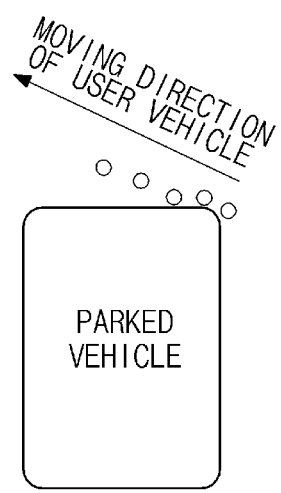
Figure 6A:
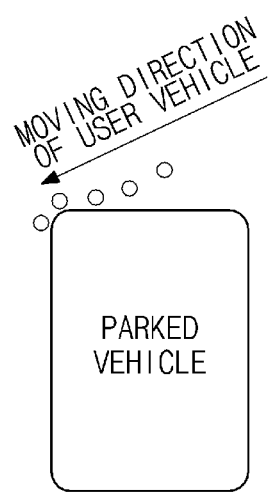

Meanwhile, FIGS. 5A and 6A show a moving direction of the user vehicle which is not parallel with a width direction of a vehicle parked in a parking space, for example, the moving direction has an angle to the width direction of the vehicle. FIG. 5A shows a situation in which a front end of the user vehicle is far away from the parked vehicle and approaching a near corner of the parked vehicle. FIG. 6A shows a situation in which rear end of the user vehicle is far away from the parked vehicle and the user vehicle is approaching a far corner of the parked vehicle.

Figure 5B:
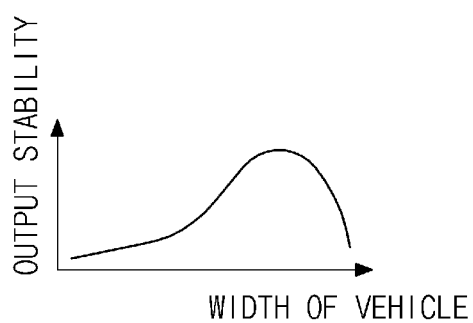

In FIG. 5A, since the output direction of the ultrasonic wave sensor of the user vehicle is not perpendicular to the width direction of the parked vehicle, it may be known that the output stability of the ultrasonic wave sensor is high at a rear end portion of the user vehicle which is close to the parked vehicle and the output stability of the ultrasonic wave sensor is lowly distributed at a front end portion of the user vehicle which is relatively far away from the parked vehicle, as shown in FIG. 5B.

Figure 6B:
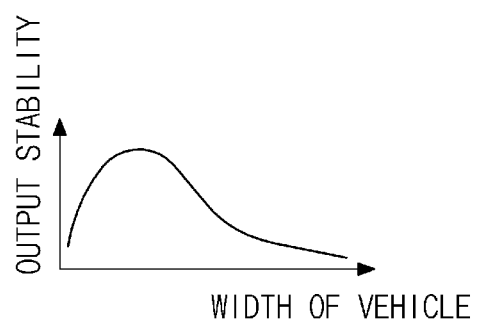

Likewise, in FIG. 6A, since the output direction of the ultrasonic wave sensor of the user vehicle is not perpendicular to the width direction of the parked vehicle, it may be known that the output stability of the ultrasonic wave sensor is high at the front end portion of the user vehicle which is close to the parked vehicle and the output stability of the ultrasonic wave sensor is lowly distributed at the rear end portion of the user vehicle which is relatively far away from the parked vehicle, as shown in FIG. 6B.

Thus, the determination apparatus applies weights to each sensed value according to the output stability of the ultrasonic wave sensor as shown in FIGS. 4A to 6B.

Figure 7:
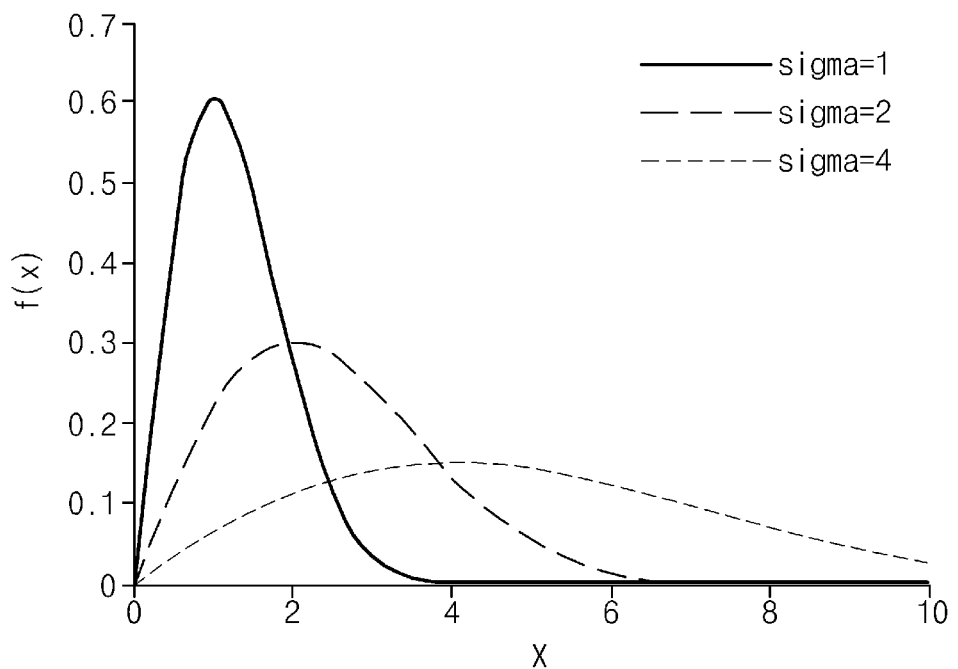

FIG. 7 shows an operation of applying a weight to an output of the ultrasonic wave sensor by modeling a relation between a shape of a parking space and an output direction of the ultrasonic wave sensor.

Specifically, FIG. 7 shows a variation of a Rayleigh function distribution according to a sigma value, where it may be known that the front weight of the function is gradually increased as the sigma value is decreased and the weights of the function are similar to each other in the entire region as the sigma value is increased.

Therefore, as the output direction of the ultrasonic wave sensor of the user vehicle is more approximately perpendicular to the width direction of the parked vehicle, a value approximate to '4' is assigned as the sigma value. As the output direction of the ultrasonic wave sensor of the user vehicle is further away from an angle perpendicular to the width direction of the parked vehicle, a value, which is less than '4', is assigned as the sigma value. Thus, the weight function may be modeled.

In this example, the determination apparatus determines that the corresponding parking space is occupied when the sum of the ultrasonic wave sensed values weighted based on the modeled weight function is greater than the predetermined reference value. When the weight sum of the ultrasonic sensor is equal to or less than the predetermined reference value, the determination apparatus determines that the corresponding parking space is available.

Hereinafter, an operation of the apparatus for determining an available parking space according to the present disclosure configured as described above will be described in more detail as follows.

Figure 8:
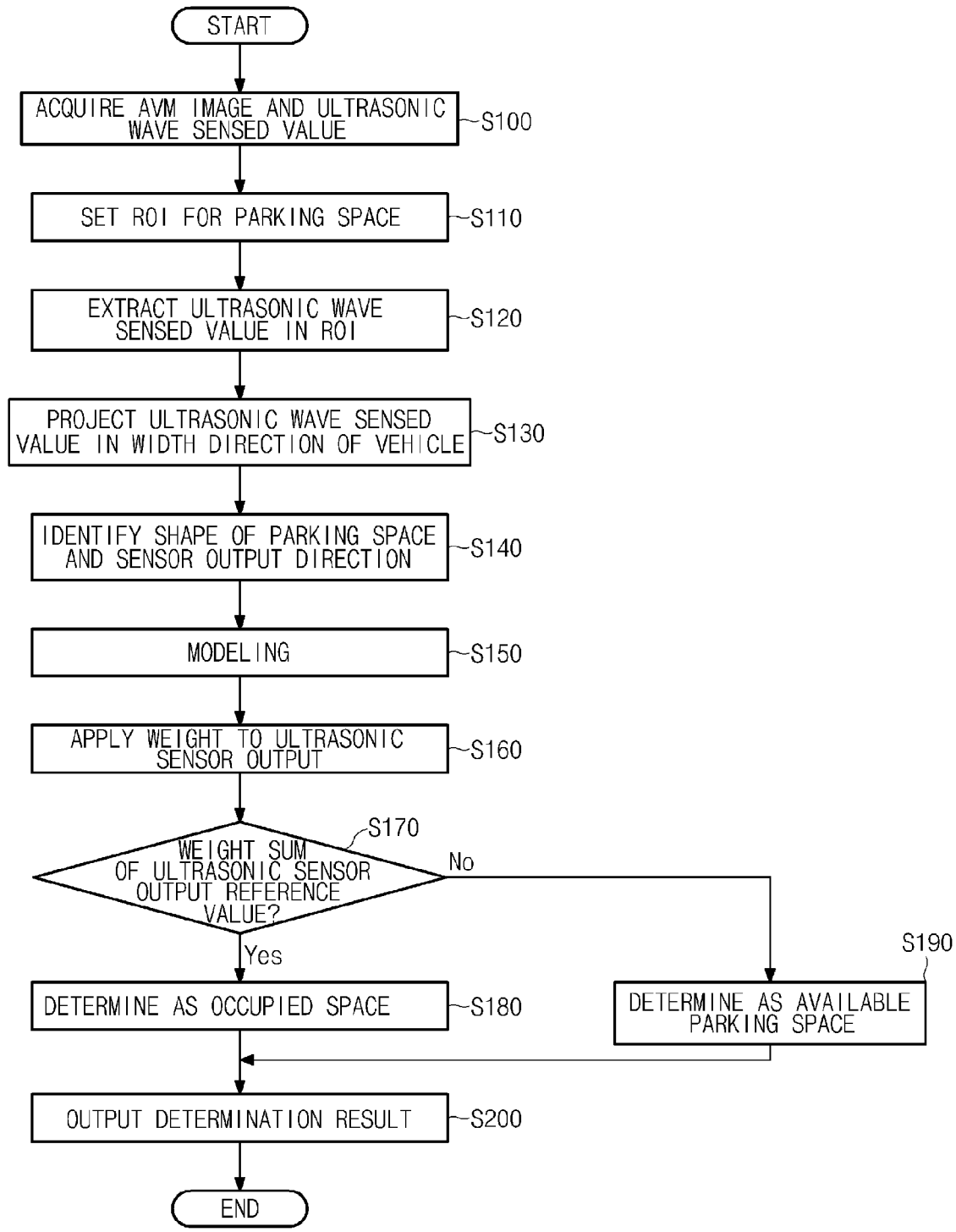
FIG. 8 is a flowchart illustrating a method of determining an available parking space according to an exemplary embodiment of the present disclosure.

FIG. 8 is a flowchart illustrating a method of determining an available parking space according to an exemplary embodiment of the present disclosure. As shown in FIG. 8, the determination apparatus according to the present disclosure may obtain an AVM image and an ultrasonic wave sensed value from the camera 20 and the ultrasonic wave sensor equipped in a vehicle (S100).

Then, the determination apparatus may search for a parking space based on the AVM image and the ultrasonic wave sensed value to set the ROI for the searched parking space (S110). The detailed embodiment for the operation of setting the ROI for the searched parking space is referred to the description of FIGS. 2A-C and 3A-C.

When the ROI is set in step 110, the determination apparatus may extract the ultrasonic wave sensed value in the ROI (S120) and project the ultrasonic wave sensed value in the entrance direction of the parking space (S130). The determination apparatus may identify a shape of the parking space and an output direction of the ultrasonic wave sensor (S140), model a relation between the shape of the parking space and the output direction of the ultrasonic wave sensor (S150), and apply a weight to the ultrasonic sensor output based on the modeling result of step 150 (S160).

Meanwhile, when the set weight is applied to the ultrasonic sensor output in step 160, the determination apparatus may calculate a weight sum of the ultrasonic sensor outputs, and compare the weight sum with the predetermined reference value. If the weight sum of the ultrasonic sensor outputs is greater than the predetermined reference value (S170, yes), the determination apparatus may determine that the corresponding parking space is occupied (S180). To the contrary, if the weight sum of the ultrasonic sensor outputs is less than the predetermined reference value (S170, no), the determination apparatus determines that the corresponding parking space is available (S190).

Therefore, the determination may output the determination results (S200), so that the determination apparatus informs the user of whether the corresponding parking space is available.

According to the present disclosure, when it is determined whether a parking space is available, a weight is applied to an ultrasonic wave sensed value considering a shape of a parking space and an output direction of an ultrasonic wave sensor such that it can be determined whether the parking space is available, thereby determining with greater accuracy whether the parking space is available.

Although exemplary embodiments of the present disclosure have been described in detail hereinabove, it should be clearly understood that many variations and modifications of the basic inventive concepts herein taught which may appear to those skilled in the present art will still fall within the spirit and scope of the present disclosure, as defined in the appended claims.

What is claimed is:

1. An apparatus for determining an available parking space, the apparatus comprising:
   a Region of Interest (ROI) setter configured to set an ROI for a parking space based on an entrance region of a searched parking space when searching for the corresponding parking space for parking a vehicle;
   a sensed value processor configured to extract sensed values measured in the set ROI from sensed values measured by an ultrasonic wave sensor and project the extracted sensed values upon an end of the corresponding parking space;
   a weight applier configured to identify a shape of the parking space and an output direction of the ultrasonic wave sensor and apply a weight to the projected sensed values according to the shape of the parking space and the output direction of the ultrasonic wave sensor; and
   a space occupancy determiner configured to determine whether the corresponding parking space is occupied based on the applied weight to the projected sensed values.

2. The apparatus of claim 1, wherein the ROI setter is further configured to set the ROI into the shape of the searched parking space.

3. The apparatus of claim 1, wherein the sensed value processor is further configured to project the sensed values measured in the ROI in the entrance direction of the parking space.

4. The apparatus of claim 3, wherein the sensed value processor is further configured to generate a rectangular region in which it is expected that another vehicle exists and project the sensed valued measured in the ROI upon an end of the rectangular region.

5. The apparatus of claim 1, wherein the weight applier is further configured to model a relation between the shape of the parking space and the output direction of the ultrasonic wave sensor and apply the weight to the projected sensed values.

6. The apparatus of claim 5, wherein the weight applier is further configured to model the relation between the shape of the parking space and the output direction of the ultrasonic wave sensor by using one of a uniform function, a Gaussian function and a Rayleigh function.

7. The apparatus of claim 1, wherein the space occupancy determiner is further configured to determine that the corresponding parking space is occupied when a sum of weights applied to the projected sensed values is greater than a predetermined reference value.

8. A method of determining an available parking space, the method comprising:
   setting a Region of Interest (ROI) for a parking space based on an entrance region of a searched parking space when searching for the corresponding parking space for parking a vehicle;
   extracting sensed values measured in the set ROI from sensed values measured by an ultrasonic wave sensor and projecting the extracted sensed values upon an end of the corresponding parking space;
   identifying a shape of the parking space and an output direction of the ultrasonic wave sensor and applying a weight to the projected sensed values according to the shape of the parking space and the output direction of the ultrasonic wave sensor; and
   determining whether the corresponding parking space is occupied based on the applied weight to the projected sensed values.

9. The method of claim 8, wherein the projecting of the extracted sensed values projects the sensed values measured in the ROI in the entrance direction of the parking space.

10. The method of claim 9, wherein the projecting of the extracted sensed values generates a rectangular region in which it is expected that another vehicle exists and projects the sensed valued measured in the ROI upon an end of the rectangular region.

11. The method of claim 8, wherein the projecting of the extracted sensed values includes modeling a relation between the shape of the parking space and the output direction of the ultrasonic wave sensor.

12. The method of claim 11, wherein the modeling models the relation between the shape of the parking space and the output direction of the ultrasonic wave sensor by using one of a uniform function, a Gaussian function and a Rayleigh function.

13. The method of claim 8, wherein the determining of the space occupancy includes comparing a sum of weights applied to the projected sensed values with a predetermined reference value, and determining that the corresponding parking space is occupied when the sum of weights is greater than the predetermined reference value as a comparison result.

* * * * *